United States Patent [19]

Calmettes et al.

[11] Patent Number: 4,907,319

[45] Date of Patent: Mar. 13, 1990

[54] METAL CLAMP

[75] Inventors: Lionel Calmettes; Michel Andre, both of Romorantin Lanthenay, France

[73] Assignee: Etablissements Caillau, Issy6les-Moulineaux, France

[21] Appl. No.: 395,190

[22] Filed: Aug. 18, 1989

Related U.S. Application Data

[63] Continuation of Ser. No. 205,816, Jun. 13, 1988, abandoned.

[30] Foreign Application Priority Data

Jun. 22, 1987 [FR] France .................................. 87 08725

[51] Int. Cl.⁴ ............................................ B65D 63/02
[52] U.S. Cl. .................................. 24/20 R; 24/20 CW
[58] Field of Search .................. 24/20 R, 16 R, 17 A, 24/19, 271, 20 CW, 20 EE, 20 TT, 23 W, 23 EE, 484, 23 R

[56] References Cited

U.S. PATENT DOCUMENTS

| | | | |
|---|---|---|---|
| 1,705,895 | 3/1929 | Blair | 24/20 CW X |
| 3,189,961 | 6/1965 | Heller | 24/20 CW |
| 4,319,385 | 3/1982 | Marchou | 24/20 R |
| 4,402,113 | 9/1983 | Smith | 24/20 R |
| 4,742,600 | 5/1988 | Calmettes et al. | 24/20 CW X |
| 4,750,242 | 6/1988 | Calmettes et al. | 24/20 CW X |

FOREIGN PATENT DOCUMENTS

| | | |
|---|---|---|
| 1500795 | 8/1969 | Fed. Rep. of Germany . |
| 1116743 | 5/1956 | France .................... 24/20 CW |
| 2470275 | 6/1981 | France .................... 24/20 R |
| 437926 | 11/1967 | Switzerland . |
| 2112444 | 7/1983 | United Kingdom . |

Primary Examiner—Laurie K. Cranmer
Attorney, Agent, or Firm—Lewis H. Eslinger; Jay H. Maioli

[57] ABSTRACT

This device relates to a clamp constituted by a metal band wound on itself, comprising complementary tightening and/or joining elements in the vicinity of each of its ends. The band presents, in a zone preferably remote from the ends, a longitudinal slit thus defining two band sections, parallel and contiguous with respect to each other. On each of the band sections is provided at least one corrugation projecting outwardly of the clamp, each corrugation of one of the band sections being offset circumferentially with respect to each corrugation of the other band section.

1 Claim, 1 Drawing Sheet

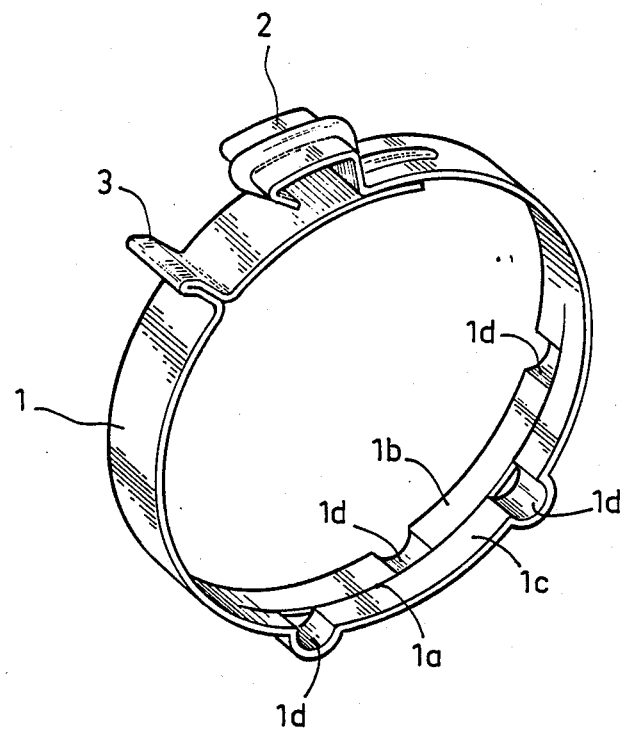

METAL CLAMP

This is a continuation of Ser. No. 205,816, filed Jun. 13, 1988, now abandoned.

FIELD OF THE INVENTION

The present invention relates to improvements in or relating to clamps, especially to those forming the subject matter of U.S. Pat. No. 4 275 484 or of U.S. Pat. No. 4 319 385. More particularly, it aims at providing, on this type of clamp, a reserve of elasticity intended to compensate the creep of the flexible hose, particularly made of rubber, on which the clamp is tightened with a view to ensuring hermetic fixation thereof on a rigid pipe.

BACKGROUND OF THE INVENTION

In fact, tightening of a clamp on a flexible hose causes creeping of the material constituting it, particularly if said hose is subjected to relatively extensive variations in temperature. This may result in the force of tightening decreasing, due to a reduction, even slight, of the diameter of the hose at the spot where the clamp is tightened. Risks of loss of tightness of the seal are then to be feared, the consequences of which may be particularly serious on certain equipment, particularly on automobile vehicles.

On the other hand, it is sometimes essential that the use of the clamps in question does not lead to too considerable efforts on the hose to be tightened, of which the diameter may vary within certain limits. It is therefore desirable that the clamps comprise means for limiting the tightening effort upon assembly on a flexible hose whose diameter attains the upper limit of the tolerances admitted.

A solution to the problems which have just be set forth has already been proposed particularly by Patent No. FR-A-2 470 275, which provides in the band constituting the clamp, at least one corrugation extending over the whole width of the band and projecting outwardly.

This corrugation, combined with a suitable rigidity of the metal constituting the clamp, gives the latter, after assembly and tightening thereof on a flexible hose, the capacity to elastically deform its periphery in the sense of reducing its length, thus enabling it to adapt itself to a reduction of the outer periphery of the hose whilst conserving a sufficient tightening force thereon.

In addition, at the moment of assembly, the corrugation limits the tightening force which is exerted on the periphery of the hose.

However, the solution proposed is not entirely satisfactory, in particular if it is impossible to place between the corrugation and the flexible hose to be tightened a strip of metal ensuring the continuity of the tightening effort over the whole periphery of the hose.

SUMMARY OF THE INVENTION

It is an object of the present invention to improve clamps of the type in question essentially comprising a metal band wound on itself, whose ends are provided with complementary tightening and/or joining means.

According to the invention, the band presents, in a zone preferably remote from its ends and the tightening and/or joining means, a longitudinal slit thus defining two band sections, parallel and contiguous with respect to each other. On each of said band sections is provided at least one corrugation projecting outwardly of the clamp, each corrugation of one of the band sections being offset circumferentially with respect to each corrugation of the other band section.

BRIEF DESCRIPTION OF THE DRAWINGS

The invention will be more readily understood on reading the following description with reference to the accompanying drawings, in which:

The single FIGURE shows a view in perspective of a clamp, improved according to the invention, in the non-tightened state.

DETAILED DESCRIPTION OF THE DRAWINGS

Referring now to the drawing, it shows a clamp of the type such as the one described in Patent No. EU-A-0 003 192. It is constituted by a metal band 1 whose two ends are provided with complementary tightening and/or joining means designated by general references 2 and 3.

In a zone remote from the joining means 2 and 3, the band 1 presents a longitudinal slit 1a defining two band sections 1b and 1c parallel and contiguous with respect to each other.

However, it is advantageous if the slit lies in the longitudinal axis of the band defining two sections of the same width and if it is made so that it does not result in a slot which would risk reducing the tightening capacity of the clamp.

On each of the band sections 1b and 1c is provided at least one corrugation 1d; preferably, and as shown in the drawing, at least two corrugations will be provided. As may be seen, each corrugation 1d extends over the whole width of the band sections 1b and 1c and all the corrugations 1d are preferably identical. However, each corrugation 1d of one band section is offset circumferentially with respect to all the corrugations 1d of the other band section.

As is known, the clamp is tightened by bringing together the tightening means 2 and 3 and by the hooks that they comprise cooperating.

During this operation, the corrugations 1d are slightly deformed elastically, and are flattened.

If, during use, the material of the tightened flexible hose begins to creep, the corrugations 1d tend to resume their initial shape visible in the FIGURE, thus maintaining the tightening of the hose at a suitable value.

However, whatever the state of deformation of the corrugations, the continuity of tightening is maintained on the whole periphery of the flexible hose thanks to the quincunx arrangement of the corrugations 1d of each band section 1b and 1c.

In addition, it may be emphasized that the multiplicity of the corrugations 1d on each band section makes it possible to limit their outward projection whilst conserving a considerable capacity of extension and, consequently, of retraction of the band in case of reduction of the diameter of the hose to be tightened under the effect of creep.

Finally, the deformability of the corrugations allows, as is known, a limitation of the tightening effort, in the event of the diameter of the flexible hose attaining the upper limit of the tolerances admitted. In this way, when the clamp is placed in position, the appearance of too considerable forces both on the hose itself and on the tightening and/or joining members 2 and 3, is thus avoided.

What is claimed is:

1. In a clamp constituted by a metal band wound on itself, comprising complementary tightening and/or joining means in the vicinity of each of its ends, the band presents, in a zone preferably remote from said ends, a longitudinal slit thus defining two band sections, parallel with respect to each other and being in contact at respective longitudinal edges formed by the slit, and, on each of said band sections is provided at least one corrugation projecting outwardly of the clamp, each corrugation of one of the band sections being offset circumferentially with respect to each corrugation of the other band section, the metal band having a constant width over its entire length.

* * * * *